United States Patent
Horsfall

(10) Patent No.: US 11,712,743 B2
(45) Date of Patent: Aug. 1, 2023

(54) KEY CUTTING MACHINE WITH IMPROVED KEY HOLDER

(71) Applicant: iKeyless, LLC, Louisville, KY (US)

(72) Inventor: David Anthony Horsfall, Eldwick (GB)

(73) Assignee: IKEYLESS, LLC, Louisville, KY (US)

( * ) Notice: Subject to any disclaimer, the term of this patent is extended or adjusted under 35 U.S.C. 154(b) by 0 days.

(21) Appl. No.: 17/247,684

(22) Filed: Dec. 20, 2020

(65) Prior Publication Data

US 2022/0193798 A1 Jun. 23, 2022

(51) Int. Cl.
*B23C 3/35* (2006.01)

(52) U.S. Cl.
CPC ................ *B23C 3/355* (2013.01); *B23C 3/35* (2013.01); *Y10T 409/300952* (2015.01)

(58) Field of Classification Search
CPC . B23C 3/355; B23C 3/35; Y10T 409/300952; Y10T 409/301008; Y10T 409/301064
USPC ..................................... 409/81–83
See application file for complete search history.

(56) References Cited

U.S. PATENT DOCUMENTS

| | | |
|---|---|---|
| 2,582,012 A | 1/1952 | Currier |
| 3,323,420 A | 6/1967 | Roxburgh |
| 3,413,892 A | 12/1968 | Casey |
| 3,442,174 A | 5/1969 | Weiner et al. |
| 3,796,130 A | 3/1974 | Gartner |
| 5,314,274 A * | 5/1994 | Heredia .................. B23C 3/35 409/81 |
| 6,065,911 A | 5/2000 | Almblad |
| 8,532,809 B2 | 9/2013 | Freeman |
| 9,468,982 B1 | 10/2016 | Mueller et al. |
| 9,895,753 B2 * | 2/2018 | Huss .................. B23C 3/355 |
| 2006/0062644 A1* | 3/2006 | Foscan .................. B23C 3/355 409/81 |
| 2009/0228795 A1 | 9/2009 | Bass |
| 2011/0297691 A1 | 12/2011 | Freeman |
| 2011/0301738 A1 | 12/2011 | Freeman |
| 2013/0138243 A1 | 5/2013 | Freeman |
| 2013/0170693 A1 | 7/2013 | Marsh |
| 2013/0331976 A1* | 12/2013 | Freeman .................. B23C 3/35 700/117 |
| 2014/0377027 A1 | 12/2014 | Burkett et al. |
| 2015/0050094 A1 | 2/2015 | Gerlings |
| 2017/0225242 A1 | 8/2017 | Spangler |
| 2018/0079014 A1 | 3/2018 | Marsh |

(Continued)

FOREIGN PATENT DOCUMENTS

| | | | |
|---|---|---|---|
| EP | 492372 A2 | * | 7/1992 |
| EP | 3412389 A1 | * | 12/2018 |

(Continued)

*Primary Examiner* — Erica E Cadugan
(74) *Attorney, Agent, or Firm* — Duncan Galloway Greenwald PLLC; Kevin T. Duncan

(57) ABSTRACT

The present invention generally relates to the field of replicating or copying keys. More specifically, the present invention provides an improved key holder assembly for use in a key cutting machine, the key holder providing a universal or multiply key type holding apparatus to simplify the process of creating a copy of a master key. Spring or otherwise biased components hold a received or inserted ley blank in a preferred position for presenting to a cutting component.

16 Claims, 12 Drawing Sheets

(56) References Cited

U.S. PATENT DOCUMENTS

2018/0264561 A1    9/2018  Schmidt
2021/0237175 A1*   8/2021  Robertson ........... E05B 19/0011

FOREIGN PATENT DOCUMENTS

| | | | |
|---|---|---|---|
| EP | 3412405 A1 | * | 12/2018 |
| EP | 3412406 A1 | * | 12/2018 |
| EP | 3466577 A1 | * | 4/2019 |
| GB | 952978 A | * | 3/1964 |
| GB | 2293341 A | * | 3/1996 |
| GB | 2563224 A | * | 12/2018 |
| GB | 2564556 A | * | 1/2019 |
| GB | 2564557 A | * | 1/2019 |
| GB | 2567194 A | * | 4/2019 |
| WO | WO-99/55482 A1 | * | 11/1999 |
| WO | WO-2008/066857 A2 | * | 6/2008 |
| WO | WO-2011/153473 A2 | * | 12/2011 |
| WO | WO-2012/170321 A1 | * | 8/2012 |
| WO | WO-2013/103774 A1 | * | 7/2013 |

* cited by examiner

KEY CUTTING MACHINE WITH IMPROVED KEY HOLDER

FIELD OF INVENTION

The present invention generally relates to the field of making, duplicating, replicating or copying keys. More specifically, the present invention relates to providing a universal key holder assembly for receiving and holding a plurality of key blanks for cutting and duplication.

BACKGROUND OF THE INVENTION

Key cutting/duplicating machines have become prevalent as owners of keys rely on and desire the ability to create duplicate or back up keys for a myriad of reasons. "Big box" and other retail stores and kiosks in shopping areas are convenient resources allowing customers greater access to machines for making duplicate keys, including directed manual or self-service operation or with directed store personnel assistance. Increasingly customers and retailers look for solutions to make processes easier and more user-friendly and intuitive for customers to "self-serve" the process of making duplicate keys. One key problem with manual key machines on the market today is machines are limited in the types of keys they can duplicate or they are confusing and require assistance or considerable time to figure out how to identify the type of key they have (master key) for duplicating, select the appropriate matched key blank, position the master key for key bitting read or information capture processes, position the selected key blank for proper cutting operation, and further processes associated with pairing more advance key types.

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems. The various proprietary Remote Access systems have evolved over time and resulting in numerous designs and platforms in the market today. A problem users face is the great variety of remote devices and systems are almost universally incompatible across vehicle brands or makes and even between different year and models of vehicles.

In addition to the programming tools and software for pairing modern car keys, remotes, remote access devices, or key fobs with a vehicle, locksmiths or other lock duplication retail outlets must provide key blades that come in many types and shapes depending on the manufacturer's requirements for the ignition cylinder. Modern blades are typically milled as opposed to traditional grinding wheel approaches. These special cutting tools are very expensive and selecting key blanks and properly positioning master keys and key blanks is complicated and must be precise for effective key duplication.

Problems exist in the identification of the bitting patterns and other information related to the type, shape, contour, and other characteristics related to the key blade for a master key to be copied. Specifically, issues exist in properly identifying the exact shape of the key blade, compensating for wear or damage to the key blade, verifying that the key blade being examined matches a key blank to be copied, verifying that the bitting pattern observed or determined from a master key is a valid pattern, and in cutting a key copy from a blank based on information gathered from a master key. Such issues include issues with the positioning of the master key relative to an information gathering system, such as a camera, and may include parallax, shadows, foreshortening, and blurriness of a captured image.

Also, a problem with many key cutting machines is either they are not designed to cut a variety of key types or if they can cut multiple different key types they require selective positioning among multiple key holders. Selecting the proper key blank, selecting the proper key holder and then positioning the key appropriately can be difficult at best and often overwhelming to customer users and even to trained sales operators leading to defective duplication and to lost sales.

What is needed is a system and method for effectively and accurately holding master key and selected key blanks in place for effective capturing of information from a master key to be copied and positioning of the key blank for cutting. What is needed is a system that can hold a variety of master key types and blank key types to simplify the overall user experience when making duplicate keys.

SUMMARY OF THE INVENTION

The present invention provides an improved key holder assembly for use in a key cutting machine to make desired keys including duplicates of master keys presented at the key cutting machine at the time of duplication. For example, a typical key cutting machine will have a means for receiving or capturing data from a master key to be copied using a key cutting or copying process on a selected key blank received via the key holder assembly. The cutting machine may decode the information captured from the master key to determine a set of characteristics, such as key blade type, cut depth, bitting information, and key decoding measurements for the master key to be used in the cutting of a duplicate key from a key blank.

A key blank or "keyblank" is a key that has not been cut to a specific key bitting or key pattern. Key blanks are typically selected to match a master key to be duplicated to have a specified cross-sectional profile to match that of the master key and the keyway in a corresponding lock cylinder operated by the master key. Key blanks come in a variety of shapes and sizes, a variety of lengths, thicknesses and other dimensions and may have a variety of other grooves or the like to correspond to a particular lock cylinder. It is critical to select a correct key blank for making a duplicate or else the cut key blank may not work with the intended lock cylinder and will be useless. Blanks for duplicating keys often have characteristics of an individual manufacturer such as the profile of the key bow, or the large, flat end.

An appropriate key blank may be selected based on known or detected information associated with the master key or the lock or vehicle to be operated with the duplicate key. For example, the user interface of a key cutting machine may have or have access to a database of key information. By inputting certain information, e.g., make, model and year of a vehicle, the user interface may provide a customer or key cutting machine operator with the particular SKU (stock keeping unit) or other key blank assigned identifier to enable accurate selection of a key blank for cutting that will, with correct bitting information, operate the target vehicle. Once the correct key blank is selected it is placed in a key holder assembly of the present invention for cutting by a cutting component based on master key or other key bitting information. The key bitting information may be based on detection processes at the cutting machine, e.g., laser scanning or photographic imaging, or may be received from a remote source, e.g., a key data bank.

Relative to the capturing and decoding of information related to typical residential keys, the capturing and decoding of information related to vehicle keys, car keys, key blades with an attached remote or key fob, or novelty or designer keys (generally referred to herein as "vehicle keys") introduces a number of problems, among other improvements and solutions, that are solved by the system and method of the present invention. With vehicle keys, when the key blade is positioned on a scanning surface, such as a scanning glass, for an image of and information related to the key blade to be captured by an image capture device, such as a camera, laser, or camera and laser imaging system, the size, shape, contours and/or dimensions of the vehicle key or its remote or fob may prevent the key from being optimally positioned on the scanning surface. An exemplary system for capturing and decoding key information for cutting duplicate keys is disclosed in U.S. Patent Application Ser. No. 62/970,661, filed Feb. 5, 2020, and entitled SYSTEM AND METHOD FOR CREATING DUPLICATE KEYS (Robertson et al.), which is hereby incorporated by reference herein in its entirety.

Replacement keys may directly replicate or emulate all features of the vehicle OEM key or may include additional features unique to a universal remote head key ("URHK"). A URHK is a universal key that combines a keyfob/keyless entry system, transponder, and key blade into a single unit that may be programmed and configured to operate with a wide range of vehicle makes and models. URHKs and the systems and methods for programming them are described in METHOD AND APPARATUS FOR IMPLEMENTING MULTI-VENDOR ROLLING CODE KEYLESS ENTRY SYSTEMS, U.S. patent application Ser. No. 14/165,922, filed Jan. 28, 2014, also published as U.S. 2014/0218165, Johnson et al., which is incorporated by reference herein in its entirety. Methods and systems for dongle-based key pairing and programming are described in U.S. Provisional Patent Application No. 62/690,326, entitled SYSTEM AND METHOD FOR PAIRING A KEY WITH A VEHICLE VIA A VEHICLE COMMUNICATIONS PORT BY A DONGLE, Johnson et al., filed Jun. 26, 2018, and in U.S. Provisional Patent Application No. 62/703,669, entitled SYSTEM AND METHOD FOR PAIRING A KEY WITH A VEHICLE VIA A VEHICLE COMMUNICATIONS PORT BY A DONGLE, Johnson et al., filed Jul. 26, 2018, both of which are incorporated herein by reference in their entirety. Replacement keys and related information may be stored in a "key bank" such as described in U.S. Provisional Pat. Application Ser. No. 62/695,620, filed Jul. 9, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), and in U.S. patent application Ser. No. 16/153,602, filed Oct. 5, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), both of which are incorporated herein by reference in their entirety. Another system is described in U.S. Provisional Patent App. 62/859,579, entitled SYSTEMS AND METHODS FOR CREATING REPLACEMENT VEHICLE KEYS, Determan et al., filed Jun. 10, 2019, which is incorporated by reference herein in its entirety.

Retail and commercial machines for the copying of residential keys may include many automatic or semi-automatic systems. Several such systems and methods are described in at least U.K. Patent Application No. 201809157, filed Jun. 5, 2018, entitled KEY BLANK DISPENSING SYSTEM (Horsfall et al.); in U.K. Patent Application No. 201806414, filed Apr. 19, 2018, entitled KEYS (Horsfall); in U.K. Patent Application No. 201708957, filed Jun. 6, 2017, entitled KEY BLANK DISPENSING SYSTEM (Horsfall et al.); in U.K. Patent Application No. 201509700, filed Jun. 4, 2015, entitled IMPROVEMENTS IN OR RELATING TO KEY CUTTING AND KEY CUTTING APPARATUS (Horsfall et al.); in U.K. Patent Application No. 201607933, filed May 6, 2016, entitled IMPROVEMENTS IN OR RELATING TO KEY CUTTING AND KEY CUTTING APPARATUS (Horsfall et al.); in U.S. patent application Ser. No. 16/567,912, filed Sep. 11, 2019, entitled KEY CUTTING APPARATUS (Horsfall et al.); and in U. K. Design Application Nos. 4039724 and 4039725, entitled "MY KEY MACHINE Devices; Mikey the Robot Device" (Horsfall), each of which are incorporated by reference herein in their entirety.

Key cutting machines may be a retail system wherein a customer brings a master key to be copied to a retail location where a key scanning and cutting system is located. The customer, assisted by an employee or entirely by the employee, operates the key scanning and cutting system by placing the master key in the system, navigating a series of menu options presented in a graphical user interface by operating one or more user interface elements which may include physical user inputs on the key scanning and cutting system, selecting the matching key blank for duplication, and obtaining the cut key copied based on the master key.

A problem with many existing key cutting machines is they are limited in the types of keys they are configured to accept and cut. This frustrates the customer when the type of key they want duplicated is not compatible with the cutting machine. Another problem is retailers have to have multiple machines to cut a wider variety of keys of interest to their customers. This takes up excessive floor space and complicates inventory maintenance. Another problem is even in key cutting machines capable of cutting a wider variety of key types they require multiple key holding assemblies and multiple openings to receive key blanks. This presents a layer of complication as customers and operators must not only select a correct key blank to match the master key to be duplicated but must also navigate to choose the correct opening and key holding assembly or slot matching the key blank for insertion of the key blank.

To solve these problems, the present invention improves over the prior art and provides a new key holder assembly capable of receiving a wide variety of key types and capable of presenting a wide variety of key types to the key cutting component internal to a key cutting machine. The present invention key holder assembly simplifies the user-experience, leads to fewer mistakes in the key cutting process, reduces loss of materials, simplifies inventory maintenance, and reduces floor space required to provide a universal key cutting facility.

In a first embodiment, the present invention provides a key cutting machine for cutting key blanks, the key cutting machine comprising: a key cutting component configured to cut a key blank based on a set of master key bitting information; a key holder assembly configured to receive and support a key blank at a desired position for cutting by the key cutting component, the key holder assembly having a common key blank opening configured to receive a multiplicity of key blank types falling within a range of physical dimensions, the key holder assembly comprising: a key holder block; a first angled ramp and a second angled ramp, at least one of the first and second angled ramps being slidingly supported by the key holder block, wherein the first and second angled ramps face opposite one another and are configured to define in part the key blank opening for receiving key blanks within the range of physical dimensions; at least one first biasing member configured to provide a first biasing force to bias at least one of the first and second angled ramps toward the other angled ramp to present an undisplaced position at the key blank opening with a key blank not present, wherein with a key blank inserted into the key blank opening a front edge or tip of the key blank engages the first and second angled ramps to overcome the first biasing force and displace at least one of the first and second ramps to separate the first and second angled ramps to further receive a body of the inserted key blank into a holding area configurable within the range of physical dimensions; and at least one second biasing member configured to exert a second biasing force on the inserted key blank, the second biasing force being in a direction generally orthogonal to the first biasing force; wherein the first and second biasing forces serve to hold an inserted key blank in a desired position as a prelude to cutting operation.

The first embodiment of the invention may be further characterized in one or more of the following ways: wherein the first and second angled ramps are complimentary so that the key blank opening is characterized in part by a V-shaped area that narrows as a key blank is inserted into and engages the first and second ramps; further comprising a pair of holding walls respectively adjacent the first and second angled ramps, wherein the first biasing member exerts the first biasing force against the inserted key blank at the pair of holding walls; wherein the first and second angled ramps present a combined angle of between 35 to 55 degrees; wherein the key holder assembly further comprises an insertion limiter adapted to limit the extent a key blank may be inserted through the key blank opening; further comprising a receiving area for supporting and positioning a physical "master" key to be duplicated; further comprising a user interface having an input adapted to receive input information from a user and a display for prompting a user to take certain steps in the key cutting process; wherein the key holder assembly comprises: a key holder clamp including the first angled ramp; a key clamp plunger oppositely facing in part the key holder clamp and including the second angled ramp and being slidingly supported by the key holder block; wherein with a key blank inserted into the key blank opening a front edge or tip of the key blank engages the first and second angled ramps, acts against the first biasing member, and displaces the key clamp plunger in a direction away from the key holder clamp separating the first and second ramps; wherein the key blank opening and the key holding area are defined by the key holder block, the key clamp plunger and the key holder clamp; wherein the key holder block is operably connected to a motor via a shaft and is movable by way of the motor to present a received and supported key blank to the key cutting component for key cutting operation; further comprising a receiving area for supporting and positioning a physical "master" key to be duplicated; wherein the key holder assembly is adapted to hold each of the set of key types comprising automotive, residential, high security, and flip key; wherein the first and second ramps each have a wall depth δ of approximately 3 mm; wherein the second biasing member comprises a spring pin assembly received in one or more bores formed in one or more of the key holder block and/or the key clamp plunger and wherein the spring pin assembly biases the second angled ramp toward the first angled ramp; wherein the second biasing member is received within a bore formed in the key holder clamp block opposite the key blank opening defined by the first and second ramps; and further comprising a pick up spring assembly for holding a cut key blank in place and for presenting the cut key blank to a user via the key holder assembly.

In a second embodiment the present invention provides a system for making duplicate keys comprising: a receiving area having a fixture, such as a laser scanning surface, for supporting and positioning a physical "master" key to be duplicated; a user interface having an input adapted to receive input information from a user and a display for prompting a user to take certain steps in the key cutting process; a key holder assembly adapted and configured to receive and support a key blade or blank for duplicating based on the master key, the key holder assembly being adapted and configured to receive a multiplicity of key types at a common key blank opening and comprising: a key holder block rotatable about a pivot shaft in key cutting operation by way of a motor; a fixed key holder clamp block having a first ramp fixed relative to the key holder block; a key clamp plunger having a second ramp and being slidingly supported by the key holder block; and a spring-biased member; wherein the first and second ramps face opposite one another and in part define a key blank opening for receiving a key blank; wherein with a key blank inserted into the key blank opening a front edge of the key blank engages the first and second ramps and causes the key clamp plunger to be displaced resulting in a separation of the first and second ramps; and wherein with a key blank inserted the first and second ramps exert a first holding force in a first direction and the spring-biased member engages the key blank and exerts a second holding force in a second direction to maintain a desired positioning of the key blank within the key holder assembly for key cutting operation.

The second embodiment of the invention may be further characterized in one or more of the following ways: wherein the key holder assembly is adapted to hold each of the set of key types comprising automotive, residential, high security, and flip key; wherein the first and second ramps when positioned in the assembly in a biased and undeflected manner present a combined angle at the key blank opening of between 25 and 60 degrees; wherein the first and second ramps when positioned in the assembly in a biased and undeflected manner present a combined angle at the key blank opening of approximately 45 degrees; wherein the first and second ramps each have a depth δ of approximately 3 mm; further comprising a spring pin assembly received in one or more bores formed in one or more of the key holder block and/or the key clamp plunger and wherein the spring pin assembly biases the second ramp toward the first ramp to define the key blank opening for receiving a key blank; wherein the spring-biased member comprises a ball bearing adapted and configured and positioned to engage a key blank inserted into the key blank opening; wherein the spring-biased member is received within a bore formed in the fixed key holder clamp block opposite the key blank opening defined by the first and second ramps; wherein bore has a threaded inner surface and the spring-biased member is a spring plunger having a threaded outer body, whereby the threaded spring plunger is rotatably disposed and received in the bore at a desired position; further comprising a means for limiting the extent to which a key blank may be inserted into the key blank opening; further comprising a pick up spring assembly for holding a cut key blank in place and for presenting the cut duplicate key to a user via the key holder assembly; further comprising a cover having a cover opening adjacent the key blank opening through which a key blank of a first type selected from a plurality of key blanks of a plurality of key types is inserted;

The first and second embodiments of the invention may be further characterized in one or more of the following ways: wherein the master key is a vehicle key placed on a scanning surface such as a glass surface; further comprising a camera or imaging device adapted to capture a first image of the master key and determine a shoulder area of the master key; wherein based on the first image, targeting a laser at a first location near the shoulder of the master key key blade and projecting a first laser line on the master key key blade; wherein capturing by a camera or imaging device a first sequence of images of the projected first laser line on the master key key blade; further comprising a processor adapted to determine a first horizontal distance from an end or tip of the master key key blade to the projected first laser line; wherein the processor determines a first blade height of the master key key blade; further comprising a laser adapted to target, based at least in part on the first horizontal distance and the first blade height, a second location on the master key key blade and projecting a second laser line on the master key key blade, wherein the second location is either a point half-way between the first laser line and the tip of the key blade or half-way between the first laser line and the master key key blade shoulder; wherein the camera or imaging device captures a second sequence of images of the projected second laser line on the master key key blade; wherein the processor determines a second horizontal distance from the end or tip of the master key key blade to the second laser line; wherein the processor determines a second blade height of the master key key blade based on the second laser line; wherein the processor determines a pitch angle of the master key key blade relative to the scanning surface based upon the first horizontal distance, the first blade height, the second horizontal distance, and the second blade.

BRIEF DESCRIPTION OF THE DRAWINGS

To facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Also, while the exemplary embodiments describe use of lasers, this is not limiting to the invention and one possessing ordinary skill in the art would understand the invention may be used in connection with other suitable means of presenting accurate and repeatable "lines" or "stripes" onto key structures discernable by a camera in connection with the processes described in detail hereinbelow. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

FIGS. 1-5 provide views of a key holder assembly for use in key cutting machines in accordance with a first embodiment of the present invention.

Figure 1:
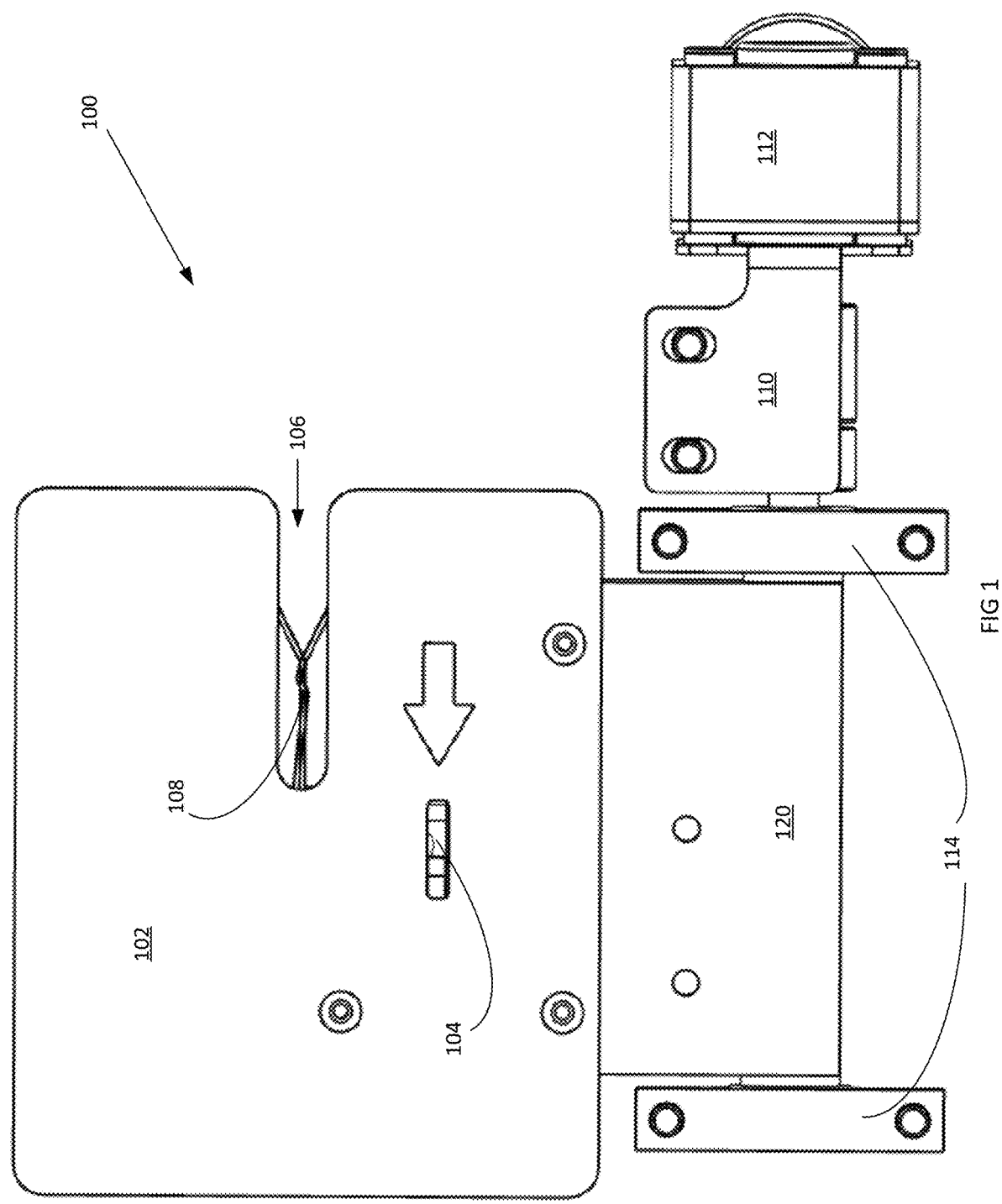
FIGS. 1-5 provide views of a key holder assembly for use in key cutting machines in accordance with a first embodiment of the present invention.

With reference to FIGS. 1-5, key holder assembly 100 is shown comprising a cover plate 102, a key holder block 120, a worm gear motor 112 and motor bracket 110, a key holder clamp block 130, and a key holder side plunger 140. As shown in FIG. 1, cover plate 102 includes key blank positioning and receiving opening 104 and a key blank return slot 106. A user inserts a key blank into the opening 104. Once positioned and otherwise ready for cutting, the key blank is operated on by a cutting component to produce a copy of a master key. The master key is separately received by the cutting machine and separately examined to extract key bitting and other information for use in cutting the key blank positioned within opening 104. Key pick up spring assembly 108 comprise return springs used to return cut keys to the user or operator after a key cutting operation is completed by the key cutting component/cutter.

Key holder block 120 is supported by means of opposite-facing key holder pivot brackets 114 and pivot shaft 118, which is operatively connected to worm gear motor 112 via flexible coupling or shaft 116, which is supported by motor bracket 110. At each holder pivot bracket a bearing or the like may be used such as, for example, a self-lubricating sleeve or plain bearing including Oilite® plain bearing AM0610-10 such as available at www.oilite.com. Oilite® is a registered trademark of Beemer Precision, Inc. in the USA, Canada, United Kingdom and European Union. Worm gear motor 112 may be, for example, 12V 200 RPM 5840-31ZY Permanent Magnet DC Turbo Worm Geared Motor Reduction Motor with clockwise and counterclockwise rotation such as available at www.joom.com. In operation, after a key blank is properly positioned within opening 104 and held in place by the key holder assembly, the worm gear motor 112 rotates the key holder block 120 with key blank about pivot shaft 118 to present the key blank to the key cutting component.

Figure 6:
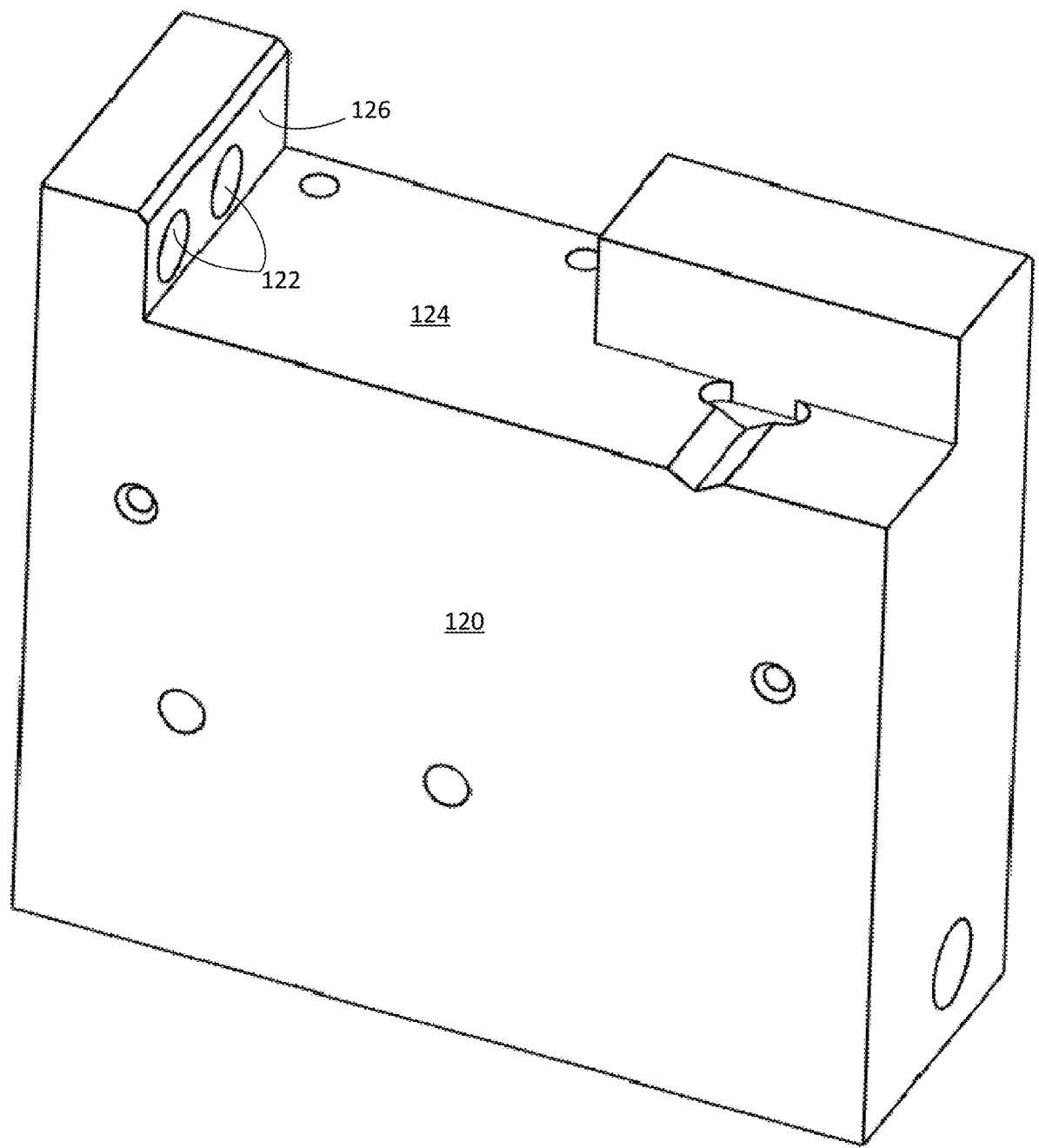
FIG. 6 provides a perspective view of a key holder block component of the key holder assembly for use in key cutting machines in accordance with a first embodiment of the present invention.

FIG. 6 provides a perspective view of the key holder block 120 to which is attached the key holder clamp block 130, the key clamp side plunger 140 and other components of the key holder assembly 100. Bores and the like are provided for receiving pins, bolts and/or other fastening components to secure the various components to the key holder block 120. Bores or journals 122 are adapted and configured to receive pin/bushing/spring assemblies 150/152/154 to permit lateral sliding movement of key clamp side plunger 140 along top surface 124. Wall or surface 126 provides a physical stop or limitation to the sliding movement and range of key clamp side plunger 140.

Figure 7B:
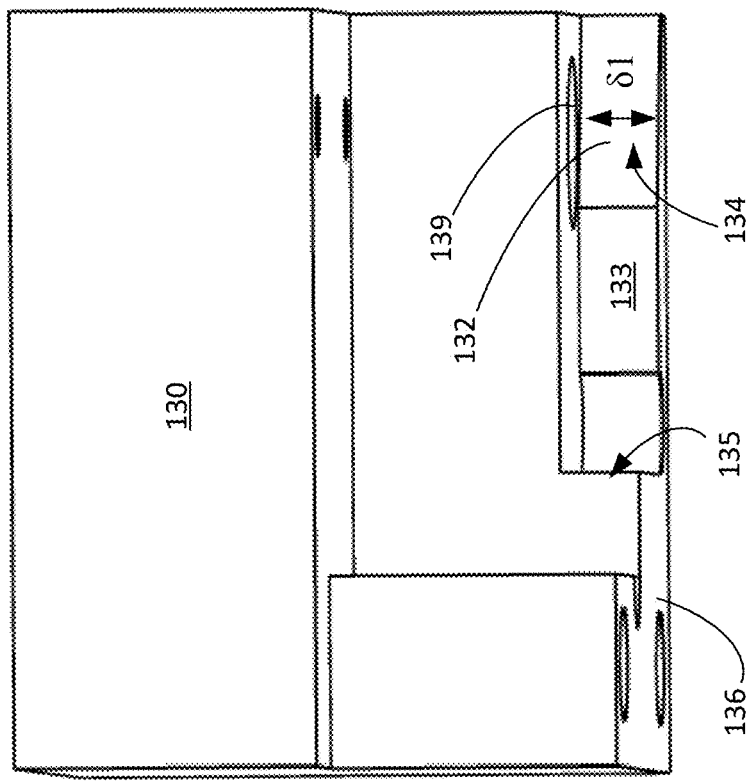
FIGS. 7A and 7B provide respective bottom (7A) and side (7B) views of a key holder clamp block component of the key holder assembly for use in key cutting machines in accordance with a first embodiment of the present invention.
Figure 7A:
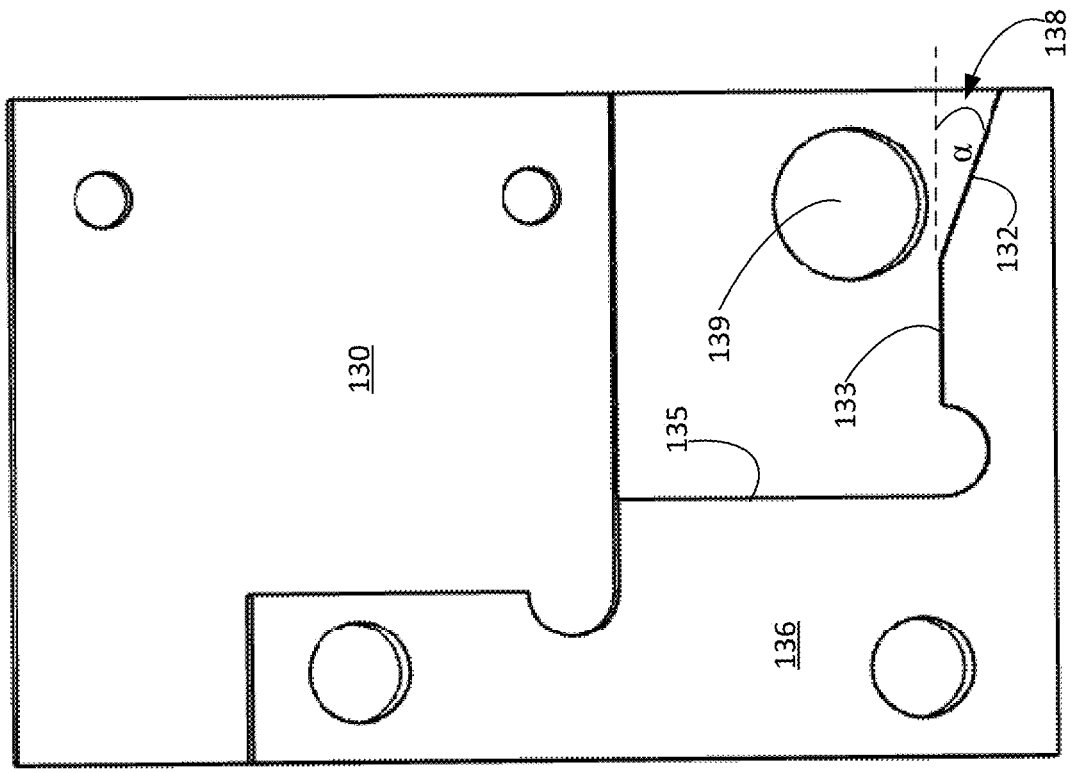
Figure 10:
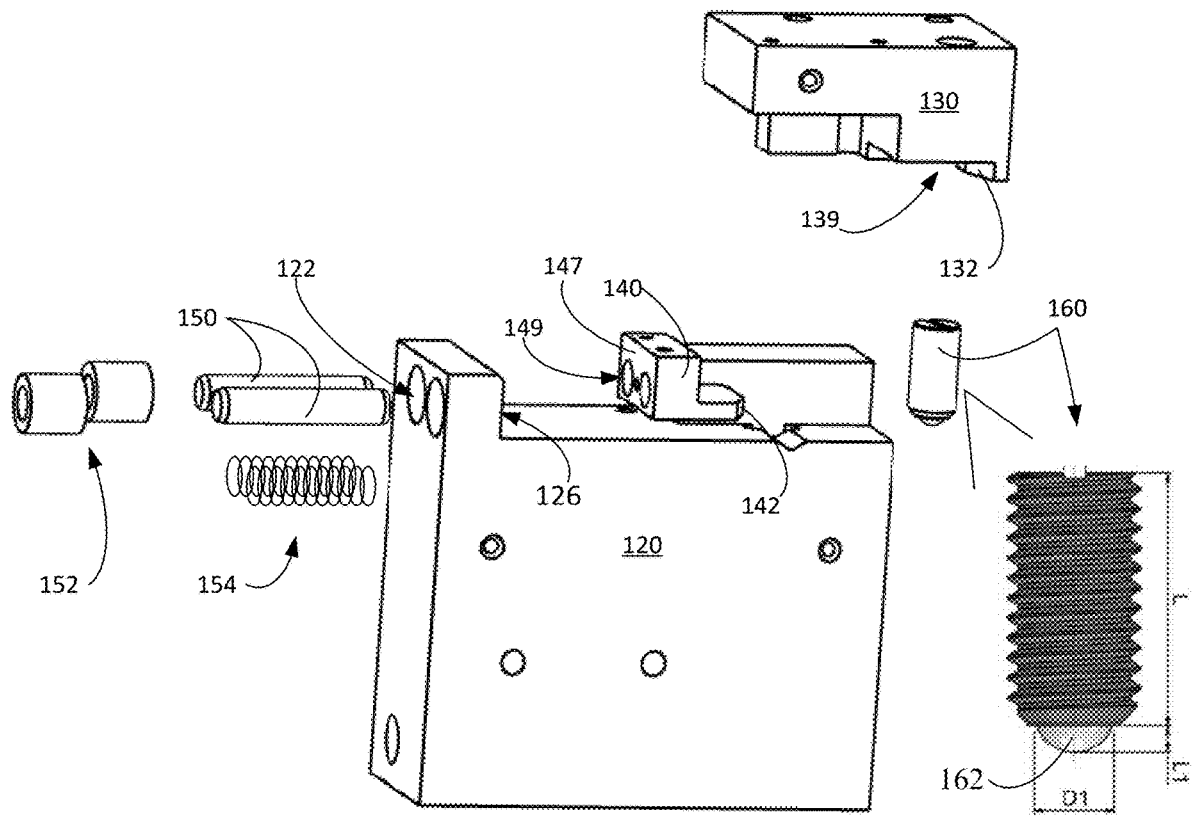
FIG. 10 provides a partially exploded perspective view of the key holder clamp block, key clamp side plunger, spring plunger, and key holder block components of the key holder assembly for use in key cutting machines in accordance with a first embodiment of the present invention.

FIGS. 7A and 7B provide respective bottom (7A) and side (7B) views of a key holder clamp block 130 of the key holder assembly 100. Key holder clamp block is fixed relative to key holder block 120. As shown, through bore or journal 139 is adapted and configured to receive, such as in a threaded fashion, a spring plunger 160 (FIG. 10). Ramp feature 132 faces opening 104/105 (FIG. 2) opposite ramp 142 of key clamp side plunger 140. As a key blank is inserted into opening 104/105 it engages the ramp 132 and the ramp 142. The ramp portion 142 of key clamp side plunger 140 also faces opening 104/105 opposite ramp 132 and in cooperation with ramp 132 an inserted key blank engages ramps 132/142 and spring plunger 160. The key holder clamp block 130 is fixed relative to key holder block 120 while the key clamp side plunger 140 slidingly moves along the top surface 124 of the key holder block 120 (described in more detail below in connection with FIGS. 10 and 11. As the key blank engages the ramp pair 132/142 it causes the key clamp side plunger 140 to displace and move along the top 124 of the key holder block 120 up to a limit defined by the distance to wall or surface 126.

Figure 9:
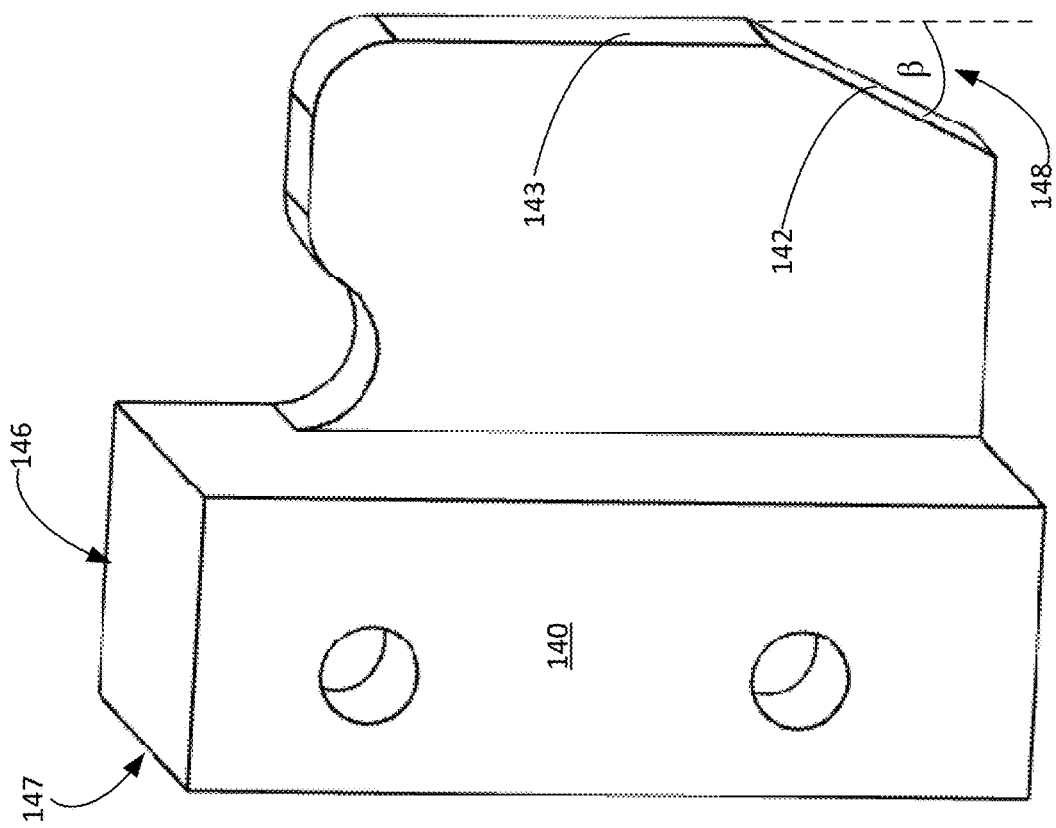
FIGS. 8-9 provide perspective views of a key clamp side plunger component of the key holder assembly for use in key cutting machines in accordance with a first embodiment of the present invention.
Figure 8:
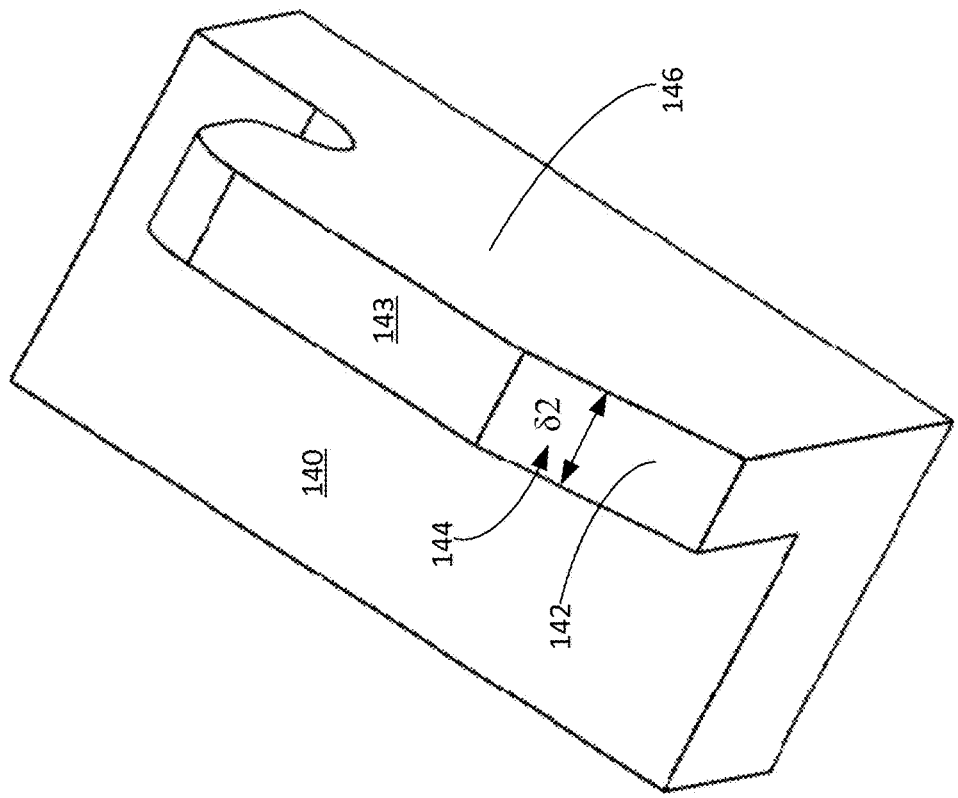

FIGS. 8-9 provide perspective views of an exemplary key clamp side plunger 140 of the key holder assembly 100 for use in key cutting machines in accordance with a first embodiment of the present invention.

As shown in the exemplary embodiment of key clamp holder block 130 (FIGS. 7A and 7B), the ramp 132 forms an angle "α" of about 20 degrees (±5 degrees) relative to the hashed line shown and the ramp 132 has a depth 134 represented by distance δ1 and terminates at section 133. Preferably, angle "α" is within the range of 15 to 25 degrees relative to the hashed line. As shown in the exemplary embodiment of key clamp side plunger 140 (FIGS. 8-9), the ramp 142 forms an angle "β" of about 25 degrees (±5 degrees) relative to the hashed line shown and the ramp 142 has a depth 144 represented by distance δ2 and terminated at section 143. Preferably, angle "β" is within the range of 20 to 30 degrees relative to the hashed line. It is important to note that angles outside these ranges have associated problems with properly receiving and accommodating certain key profiles into the key holder assembly. The depth 134 represented by distance δ1 of ramp 132 and the depth 144 represented by distance δ2 of ramp 142 are essentially equal but the depth 144 represented by distance δ2 of ramp 142 will need to be slightly less (by about 0.1-0.2 mm) with tolerance to permit clearance of the key clamp side plunger 140 for sliding operation between key holder block 120 and key holder clamp block 130. The ramp depths are critical to permit receipt of a variety of key types with a range of key heights/depths (typically the range is expected to be between 1.5 mm and 3 mm for most standard automotive, residential, high security, and flip key types) to be positioned and properly held by key holder assembly 100 for proper cutting operation. Preferably depth 134 represented by distance δ1 of ramp 132 is in the range of 3.0 to 3.2 mm and the depth 144 represented by distance δ2 of ramp 142 is in the range of 2.9 to 3.1 mm with a desired difference for clearance of the key clamp holder block 130 and key clamp side plunger 140.

As a key blank is inserted in the opening 104/105 formed by ramps 142 and 132, the front of the key blank extends past ramps 132/142 and may engage sections 133/143. Also, as shown on FIGS. 7A and 7B, a backwall 135 provides depth of insertion limit or stop to limit the extent to which a key blade may be inserted into the key holder assembly opening 104/105. Key limit or stop 135 is critical in ensuring the tip of all keys, irrelevant of length, are presented to the machine for cutting in a desired and uniform or consistent position. In one embodiment the distance from the front or beginning of the opening insertion point (the front portion of ramps 132/142) to the backwall 135 is 18 mm with a preferred range of 12-20 mm. It is important the distance to the backwall 135 not be too short or the key holder assembly may have the problem of keys/key blades fall out. It is also important the distance to the backwall 135 not be too long or the key holder assembly may have the problem of keys/key blades having plastic heads or shorter blades that may prevent the key/key blade from being capable of being inserted so the tip reaches the backwall 135.

Figure 15:
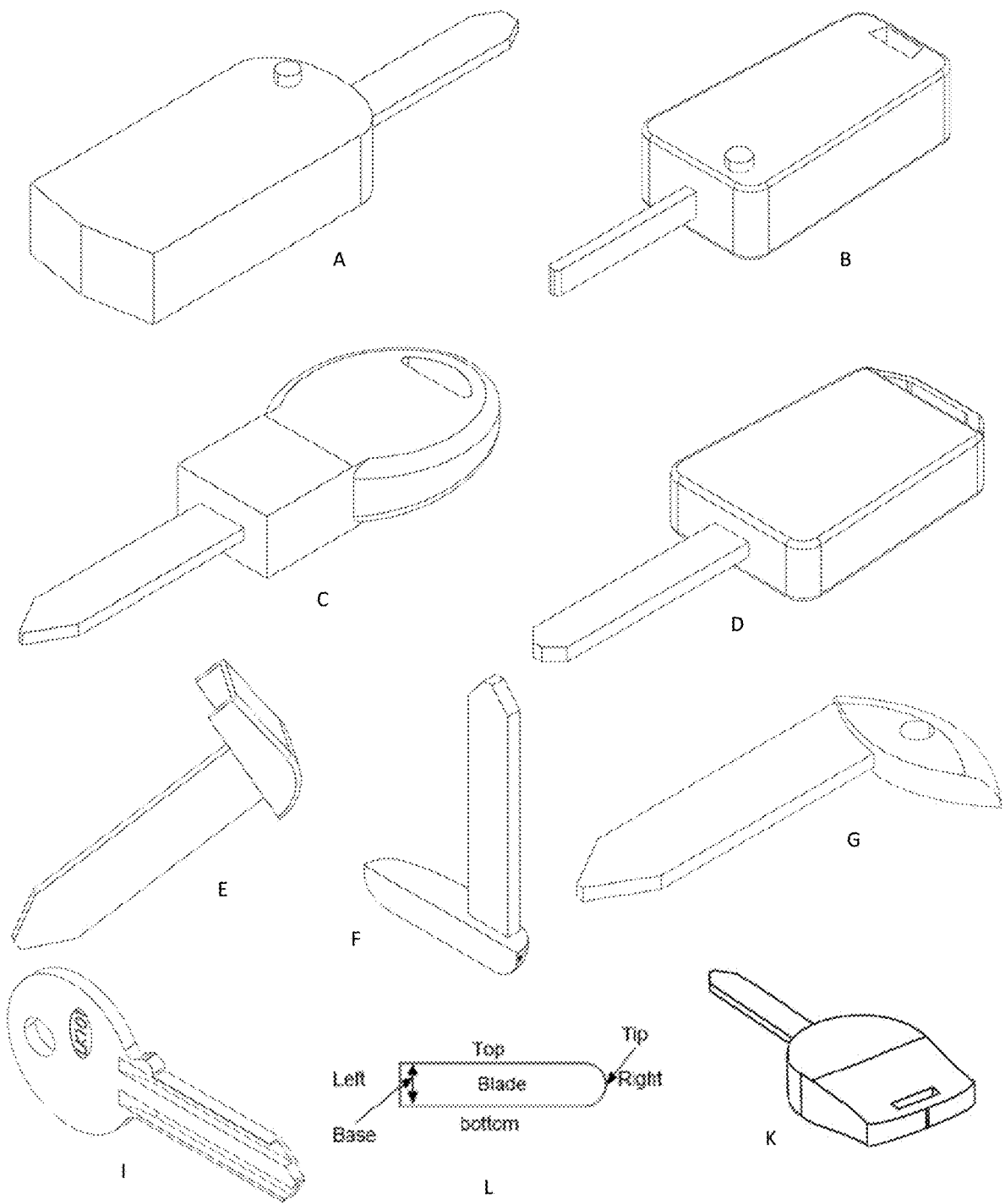
FIG. 15 provides a series of perspective views A-G, I and K-L of exemplary key types for use with the key holder assembly of the present invention.
Figure 16:
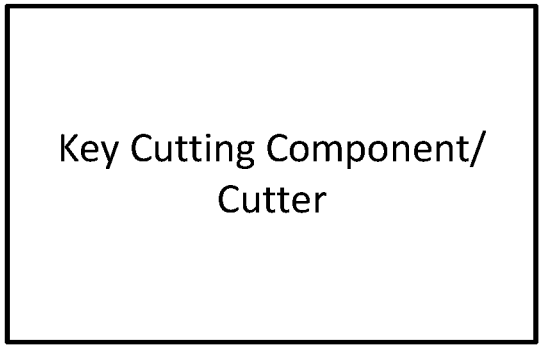
FIG. 16 schematically shows the key cutting component.

In one embodiment the distance from the front or beginning of the opening insertion point at the front of ramp 142 to the end of the ramp 142 at the beginning of intermediate wall 143 is approximately 6 mm and at the front of ramp 132 to the end of the ramp 132 is approximately 7.5 mm. As shown a radiused cutout is provided at the junction of backwall 135 and intermediate wall 133 for purpose of a relief and to remove material to reduce weight but could also accommodate keys having a protuberance at the tip. When inserting a key, there is slight resistance when pushing the tip of the key/key blade past ramps or slopes 132 and 142 due to the side springs, with friction falling away once the springs have extended to the width of the blade, with the backwall 135 being a natural stopping point on insertion of the key blank. FIG. 15 provides illustrations of a variety of typical keys and key blades for which the key holder assembly is configured or adapted to receive.

Figure 11:
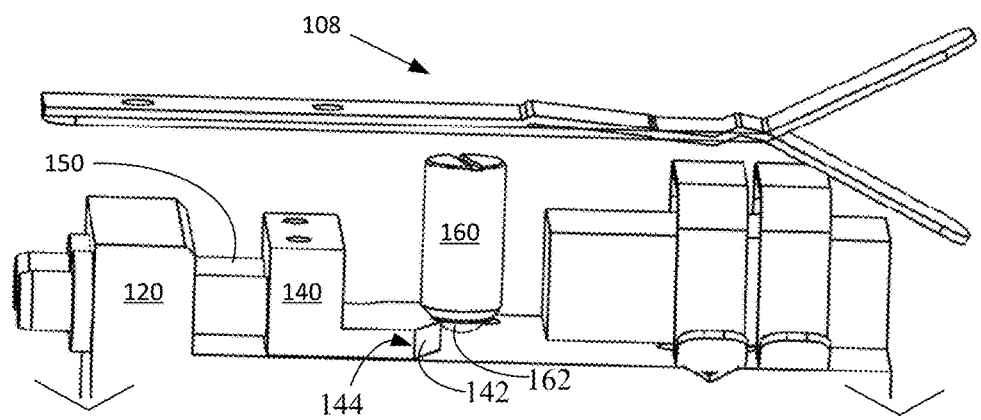
FIG. 11 provides a partial perspective view of the key clamp side plunger, spring plunger, pick up spring, and key holder block components of the key holder assembly for use in key cutting machines in accordance with a first embodiment of the present invention.

FIG. 10 provides a partially exploded perspective view of the key holder clamp block 130, key clamp side plunger 140, spring plunger 160, and key holder block 120 of the key holder assembly 100 for use in key cutting machines in accordance with a first embodiment of the present invention. FIG. 11 provides a partial perspective view of the key clamp side plunger 140, spring plunger 160, pick up spring 108, and key holder block 120 of the key holder assembly 100 for use in key cutting machines in accordance with a first embodiment of the present invention.

Figure 2:
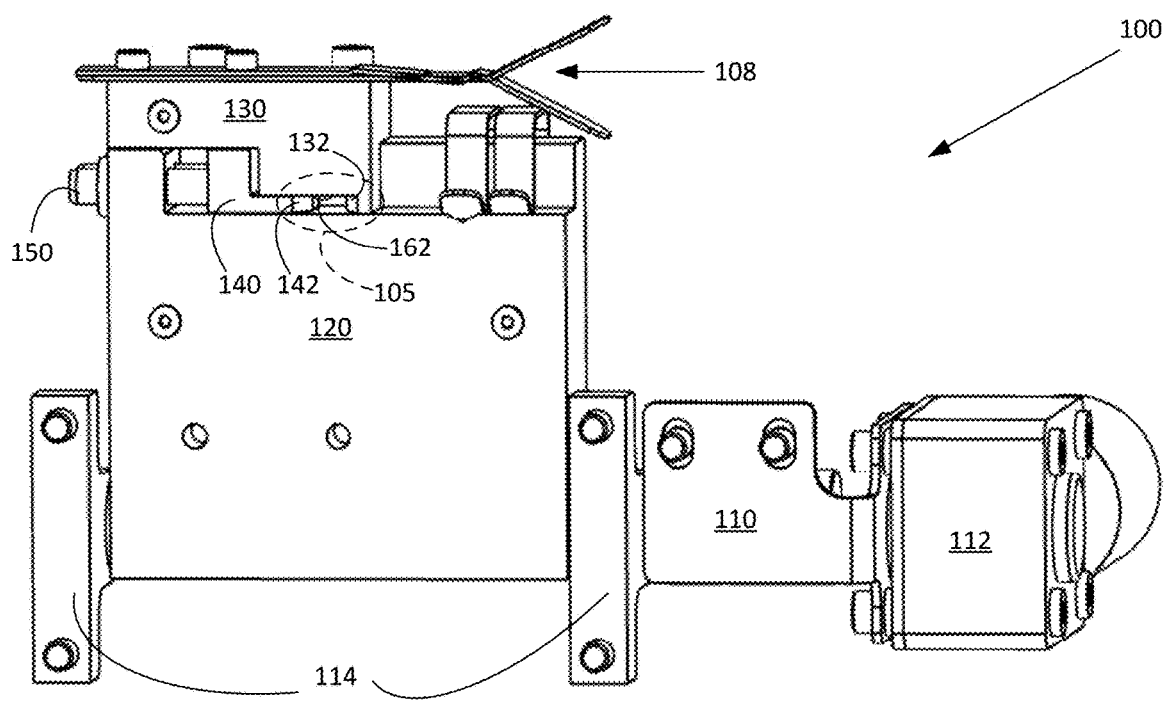
Figure 3:
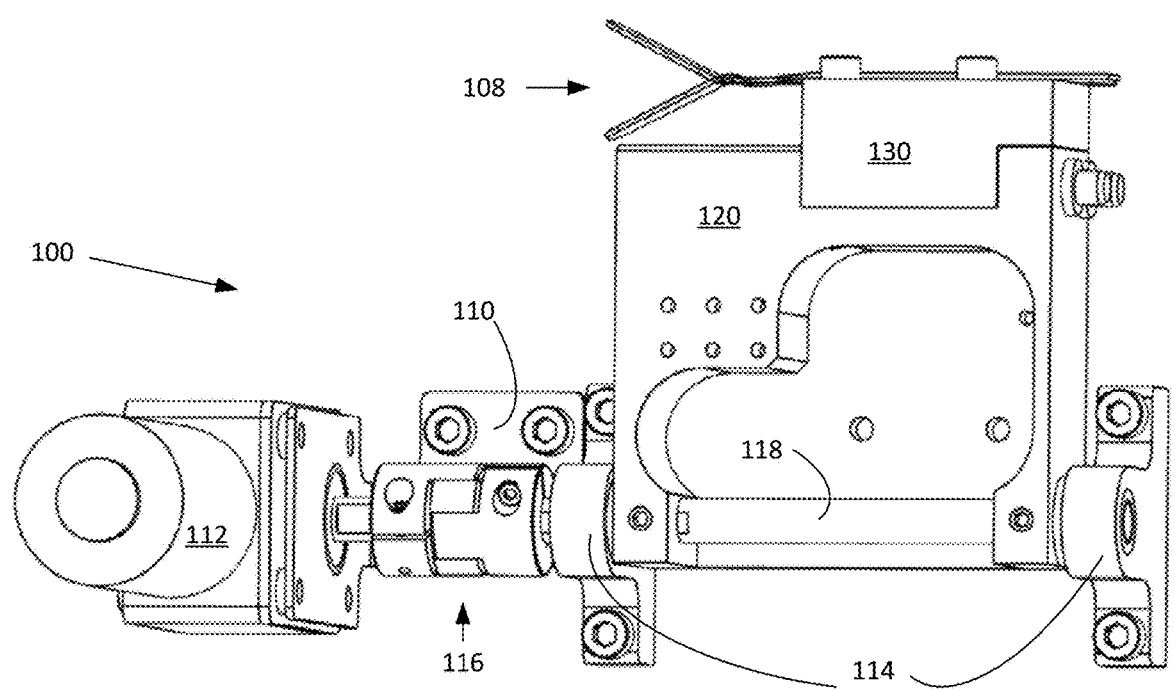
Figure 4:
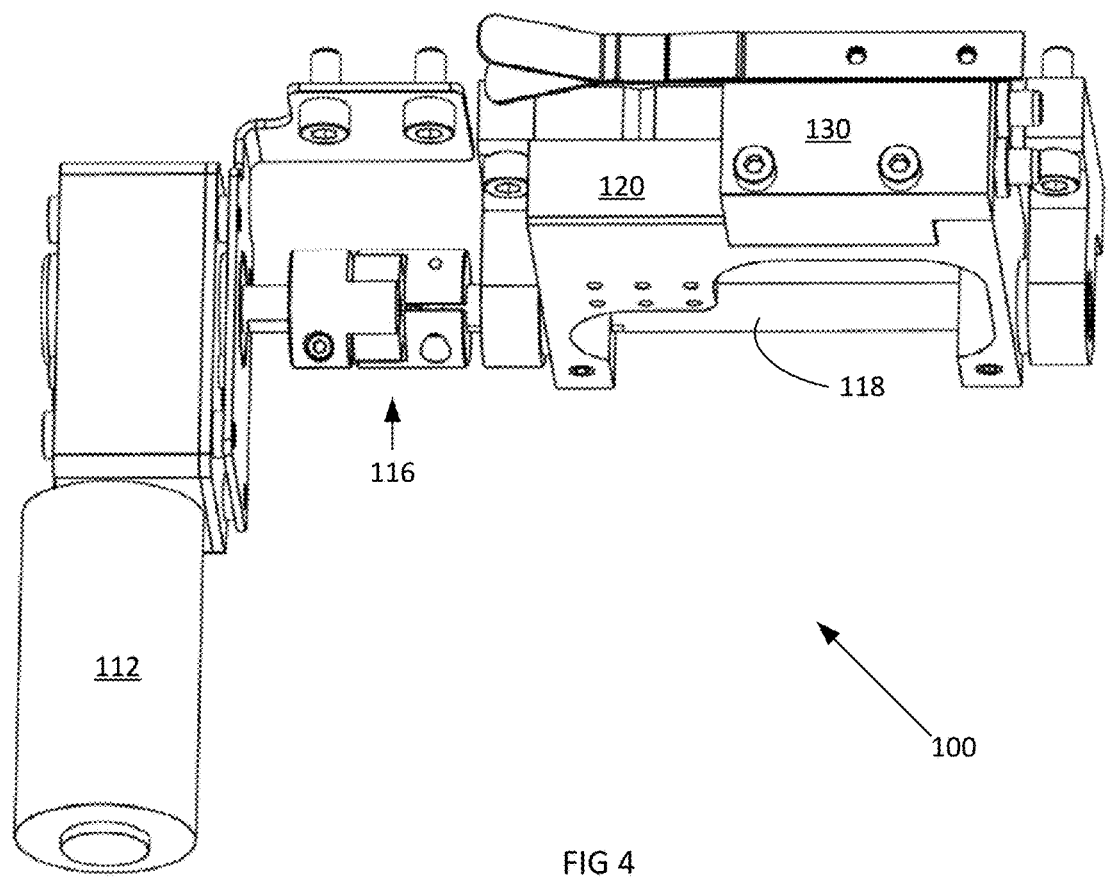
Figure 5:
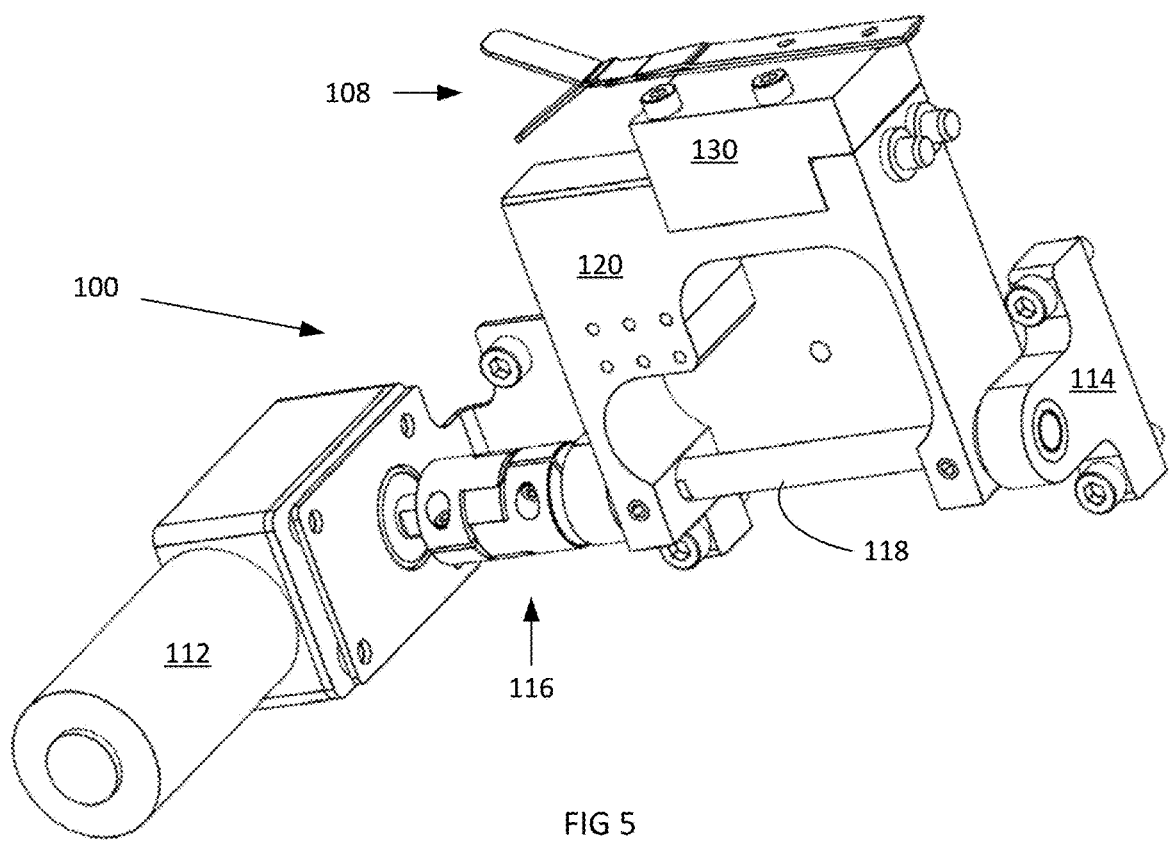

As shown in FIGS. 2, 10, 11 and elsewhere, key clamp side plunger 140 is biased toward fixed key holder clamp block 130 by springs or other biasing means 154 (e.g., coil springs or other suitable biasing means) as positioned by way of pins or dowels 150 and bushings or bearings 152 received in bores or journals 122 of key holder block 120 and aligned bores or journals 149 of key clamp side plunger 140. Bushing or bearing 152 may be, for example, a self-lubricating sleeve or plain bearing including flanged oilite bearing bush OBF081212 as available at www.oilite.com. With key clamp side plunger 140 abutting key holder clamp block 130 along the top surface of key holder block 120, the ramp pair 132/142 provide a V-shaped, angled key receiving opening of about 45 degrees (20 degrees plus 25 degrees).

Ball or Spring plunger 160, such as model WDS 843 sold by WDS Components at www.wdscomponents.com, is received in bore or journal 139 of key holder clamp block 130 and includes ball bearing 162 having diameter D1 that faces and engages a key blank positioned within opening 104 of the cover plate 102. A ball bearing 162 is preferred as the rounded nature of the ball and rotational movement facilitate and ease mechanical stress while permitting ease of insertion of a key blank and yet provide effective down force for holding the key blank in place. As shown by hatched oval 105 in FIG. 2, key facing surface of ramp pair 132/142 together with the ball bearing 162 and top or upper surface 124 of key holder block 120 define an opening for receiving key blanks. This arrangement of components is configured to accept a variety of key blanks of different types and standard dimensions including automotive, residential, high security and flip key types. In addition, the key clamp side plunger 140 is configured to be slidingly displaced along, and horizontal to, surface 124 by operation of biasing spring/pins 154/150 upon a key blank being pushed into the opening 105. The key clamp side plunger 140 is vertically held in place as it is disposed and sandwiched between key holder block 120 and key holder clamp block 130.

With reference to FIGS. 2, 7A, 7B, and 10, spring plunger 160 is threaded in this example and is received in a mating threaded bore 139 of key holder clamp block 130 along its length L. A portion of the ball bearing 162 protrudes or extends a distance of L1 from the spring plunger body at the end of the length L and is configured when secured in place in bore 139 to provide sufficient down-force on a positioned key blank to hold it in place in cooperation with the mechanical structure of the key holder assembly for cutting operation. As discussed above, the oppositely facing ramp 132 and spring-biased ramp 142 have, respectively, a depth δ1 and a depth δ2 for receiving key blanks for cutting. The extent to which ball bearing 162 protrudes beyond the opening of bore 139 is in part a function of the depth δ1 and a depth δ2 and the expected height/width of the key blank to be received in key holder assembly 100. The degree or distance to which ball bearing 162 protrudes beyond the opening of bore 139 is adjustable, such as by use of a screw driver, hex key or Allen wrench, to move the spring plunger up or down within the bore 139 in a rotational fashion. A set screw or other fixation means may be used to retain the spring plunger in a set or fixed position.

The key holder assembly 100 provides the improvement of accepting and holding for cutting operation a plurality of key types including automotive, residential, high security, and flip key. This avoids the confusion associated with selecting from multiple key blank holding structures often presented in key cutting machines and avoids the likelihood of damaged products and ineffective cutting.

Figure 12:
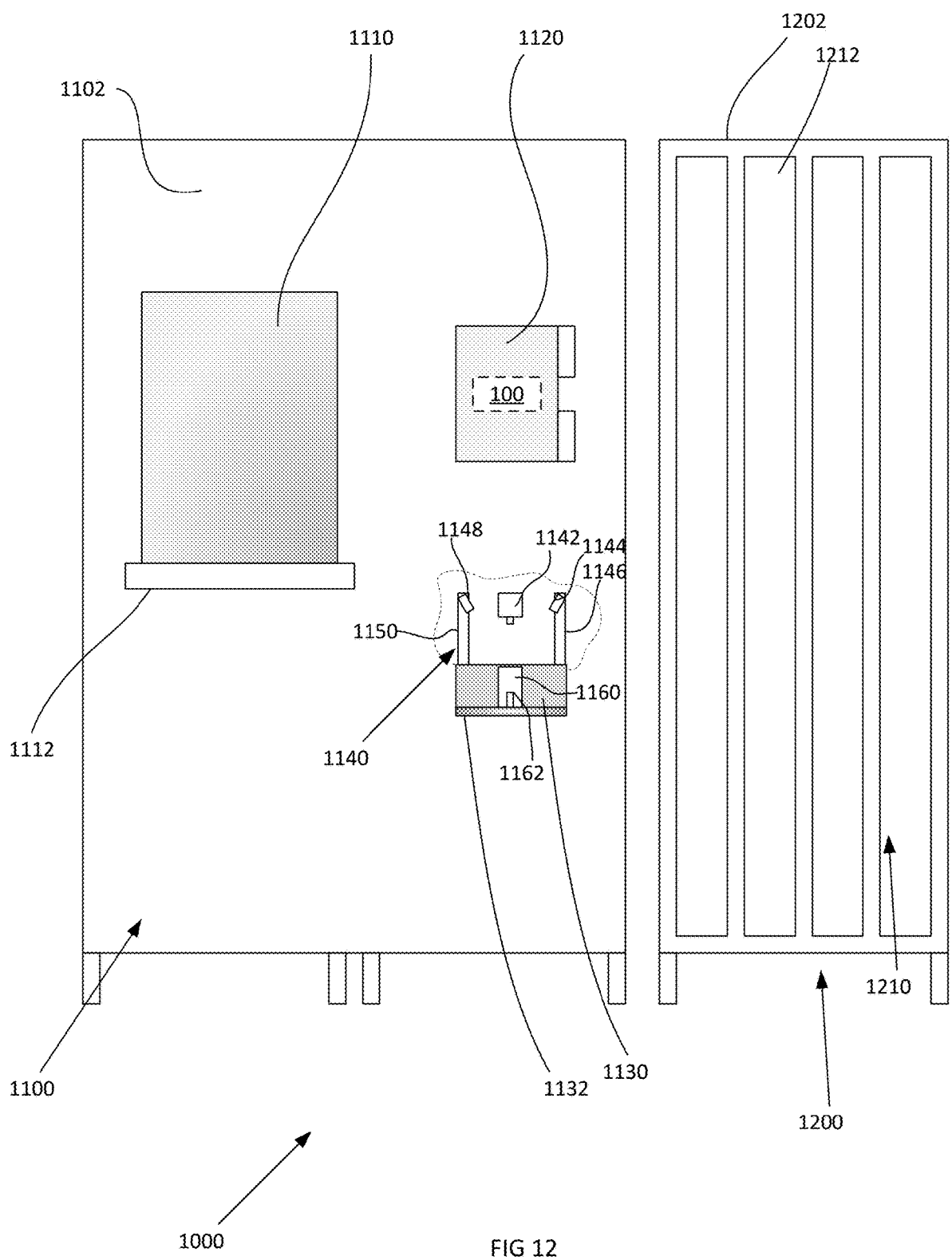
FIG. 12 provides a schematic view of the key holder assembly included in a first key cutting and key blank storage system in accordance with a first embodiment of the present invention.
Figure 13:
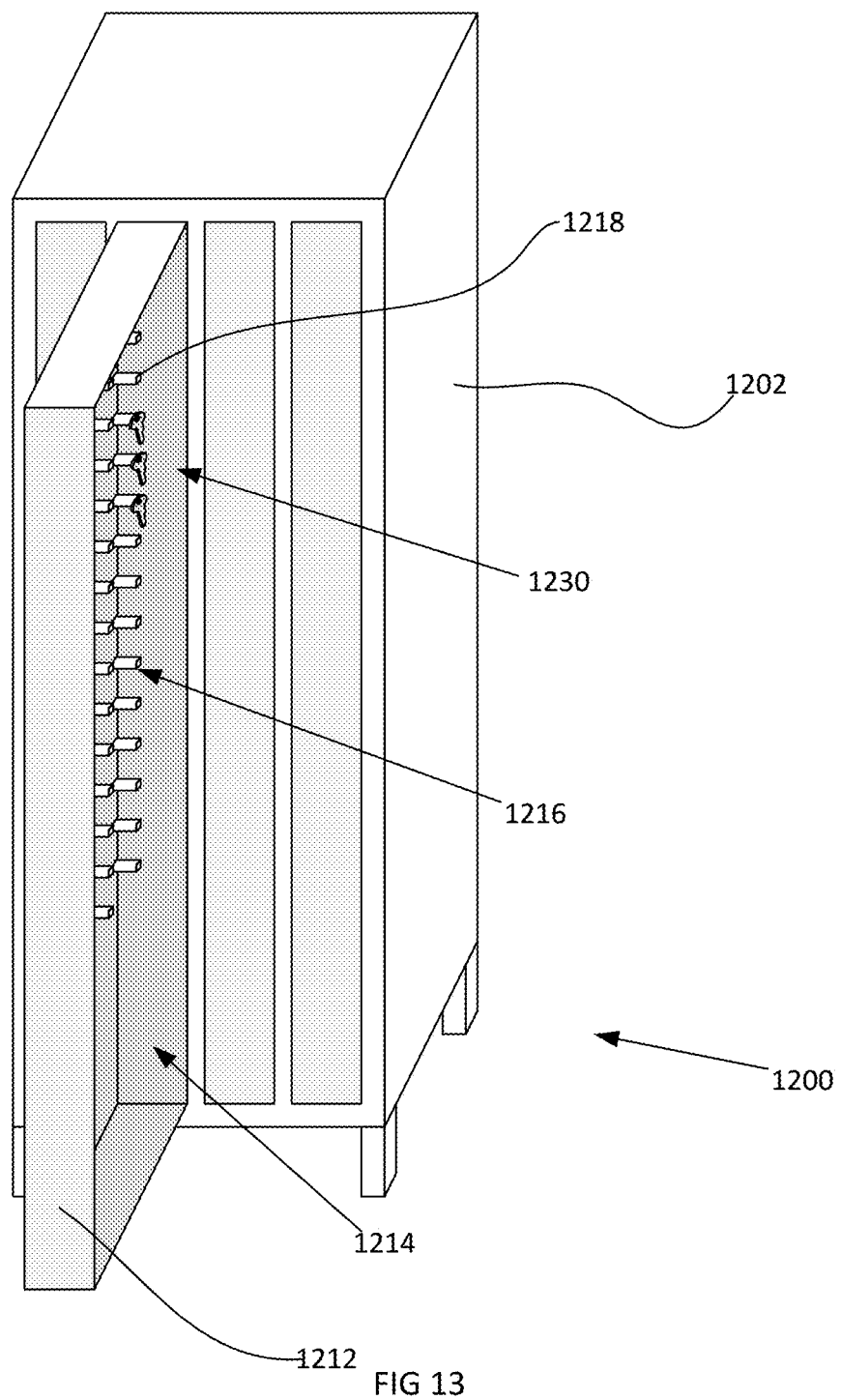
FIG. 13 provides a schematic view of the key blank storage system associated with the system of FIG. 12.
Figure 14:
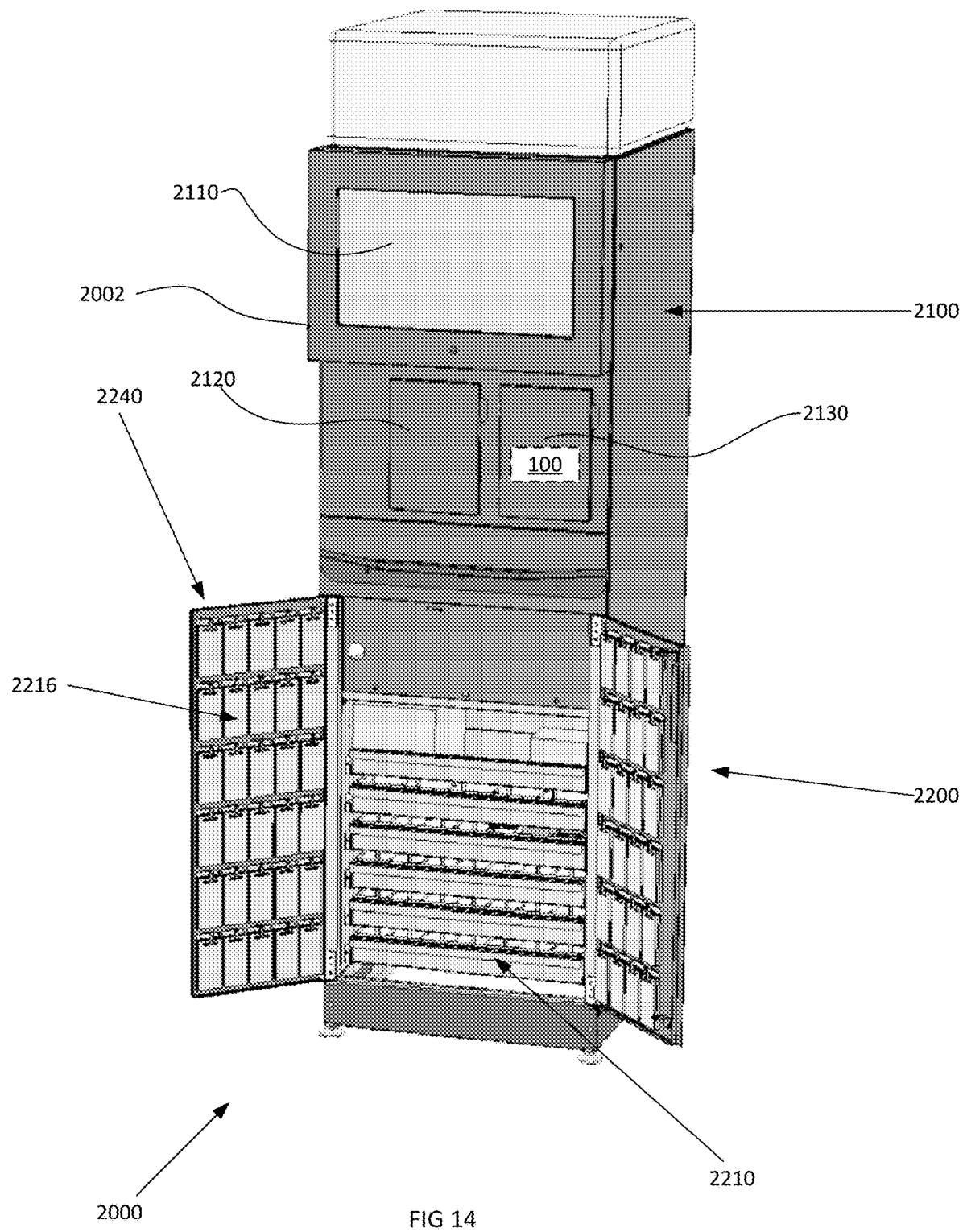
FIG. 14 provides a schematic view of the key holder assembly included in a second key cutting and key blank storage system in accordance with a first embodiment of the present invention.

FIGS. 12 and 13 provide schematic views of the key holder assembly 100 included in a first key cutting and key blank storage system 1000 in accordance with a first embodiment of the present invention. As shown in FIGS. 12 and 13, views of a key scanning and cutting system 1000 comprising a key scanning and cutting apparatus 1100 and key stock storage system 1200 are provided. The key scanning and cutting apparatus 1100 of FIG. 12 and the key scanning and cutting apparatus 2100 of FIG. 14 provide key scanning and cutting systems, described in U.S. Patent Application Ser. No. 62/970,661 incorporated herein by reference, that are usable with the key holder assembly 100 of the present invention. The key scanning and cutting apparatus 1100 comprises a main body or housing 1102 on the front or face of which a user interface or display 1110, a set of user interface elements 1112, a key cutting opening 1120, and a key scanning opening 1130 are disposed.

The user interface 1110 provides for the display of information, instructions, and for the input of user commands related to functions or services provided by the key scanning and cutting apparatus 1100 including the scanning, selecting, cutting, and ordering of replacement or cut keys for a customer's master key. The scanning opening 1130 may further comprise a scanning surface 1132 which may be a glass plate. In some embodiments, the scanning opening 1130 may be covered by a door or may be disposed in a slidable drawer in the housing 1102 of the key scanning and cutting apparatus 1100.

A customer's key to be scanned is placed in the scanning opening 1130 and the scanning apparatus 1140 captures a 3D profile of the customer's master key. A clamping apparatus 1160 may be used to secure and position the master key to be scanned using a clamping opening or key slot 1162. A set of lasers, which may comprise one or more lasers 1144 and 1148, may be positioned on tracks 1146 and 1150 to be used to project or emit a laser line onto the key blade of the master key. The tracks 1146 and 1150 may be tracks, arms, or other suitable positioning means for adjusting the position of the lasers 1144 and 1148 relative to the master key being scanned. An image capture device 1142, which may be a digital camera device, captures images of the laser line on the key blade for generating the 3D profile of the master key.

A key blank or key stock is placed in the key cutting opening 1120 and positioned on key holder assembly 100 described above, which may be covered by a swinging or sliding door, for the key blank to be cut into a cut or replacement key based on the customer's master key. The key blank is retrieved from the key stock storage system 1200.

With reference to FIG. 13, a key stock storage system 1200 comprises a set of vertical sliding drawers 1210 in the body or housing 1202 of the key stock storage system 1200. Each drawer, such as drawer 1212 has an interior space in which a plurality of storage locations 1216 are disposed. The storage locations 1216, such as storage peg 1218, may be pegs, hooks, slots, or containers capable of holding or storing one or more key blanks, such as key blanks 1230. The storage location 1216 may be removable and reorganizable such that an operator may configure the storage locations 1216 in any manner suitable to the operator, such as in a grid configuration. The key stock storage system contains key blanks for use in a key cutting system having the key holder assembly 100 described above.

FIG. 14 provides a schematic view of the key holder assembly included in a second key cutting and key blank storage system in accordance with a first embodiment of the present invention. As shown, key scanning and cutting system 2000 comprises a key scanning and cutting apparatus 2100 and key stock storage system 2200. The key scanning and cutting system 2000 comprises a housing 2002 in which the key scanning and cutting apparatus 2100 and key stock storage system 2200 are disposed. The key scanning and cutting apparatus 2100 comprises the display and user interface 2110, first door 2120 which may be a key scanning opening, and second door 2130 which may be a key cutting opening is disposed above the key stock storage system 2200. A set of doors 2240 may open to provide access to the interior of the key stock storage system which may comprise a set of horizontal drawers 2210 having individual storage compartments or areas for holding key blanks or key stock, and a set of storage locations 2216 disposed on the interiors of the set of doors 2240. The set of storage locations 2216 may be a set of pegs or hooks including a set of magnetic or self-adhesive hooks secured to or installed on the interior of the set of doors 2240 in, for example, a grid configuration.

In this example the above-described key holder assembly 100 is located behind door 2130. A user or operator is guided by way of user interface operating on display 2110 to identify and select a key blank and obtains an identified key blank from the key stock storage system 2200. The user opens door 2130 and positions a selected key blank retrieved from storage system 2200 in the key holder assembly 100 as described hereinabove.

FIG. 15 provides illustrations A-K of a variety of typical keys and key blades for which the key holder assembly is configured or adapted to receive. Illustration L provides a general scheme typically used to describe components or areas of keys and key blades and as may be used herein for purposes of describing the invention.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

The invention claimed is:

1. A key cutting machine for cutting key blanks, the key cutting machine comprising:
    a key cutter configured to cut one of the key blanks based on a set of master key bitting information;
    a key holder assembly configured to receive and support the one key blank for cutting by the key cutter, the key holder assembly having a key blank opening configured to receive a multiplicity of key blank types, wherein a blade of the one key blank is configured to be inserted in an insertion direction into the key blank opening, the key holder assembly comprising:
    a key holder block;
    a first angled ramp angled relative to the insertion direction;
    a second angled ramp angled relative to the insertion direction, the second angled ramp being slidingly supported by the key holder block, wherein the first and second angled ramps face opposite one another and are configured to define in part the key blank opening for receiving the one key blank;
    at least one first biasing member providing a first biasing force to bias the second angled toward the first angled ramp, wherein as a user inserts the blade of the one key blank into the key blank opening, a front edge or tip of the blade of the one key blank engages the first and second angled ramps to overcome the first biasing force and displace the second ramp to separate the first and second angled ramps to further receive a body of the inserted key blank into a holding area; and
    at least one second biasing member configured to exert a second biasing force on the inserted key blank, the second biasing force being in a direction that is generally orthogonal to the first biasing force and that is transverse with respect to the insertion direction;
    wherein the first and second biasing forces serve to hold the one inserted key blank in a desired position as a prelude to and during the cutting of the inserted key blank via the key cutter.

2. The key cutting machine of claim 1, wherein the first and second angled ramps are complimentary so that the key blank opening is characterized in part by a V-shaped area that narrows along the insertion direction.

3. The key cutting machine of claim 1 further comprising a pair of holding walls, each of the holding walls is adjacent to a respective one of the first and second angled ramps, wherein the at least one first biasing member causes the first biasing force to be exerted against the inserted key blank via the pair of holding walls.

4. The key cutting machine of claim 1, wherein the first and second angled ramps present a combined angle of between 35 to 55 degrees.

5. The key cutting machine of claim 1, wherein the key holder assembly further comprises an insertion limiter adapted to limit the extent the one key blank may be inserted through the key blank opening.

6. The key cutting machine of claim 1, further comprising a receiving area for supporting and positioning a physical master key to be duplicated.

7. The key cutting machine of claim 1 further comprising a user interface having an input adapted to receive input information from a user and having a display for prompting a user to take certain steps in a key cutting process.

8. The key cutting machine of claim 1, wherein the key holder assembly comprises:
    a key holder clamp including the first angled ramp;
    a key clamp plunger opposite the key holder clamp and including the second angled ramp and being slidingly supported by the key holder block;
    wherein as the one key blank is inserted into the key blank opening, the front edge or tip of the blade of the one key blank engages the first and second angled ramps, acts against the first biasing force, and displaces the key clamp plunger in a direction away from the key holder clamp, separating the first and second ramps.

9. The key cutting machine of claim 8, wherein the key blank opening and the key blank holding area are defined by the key holder block, the key clamp plunger and the key holder clamp.

10. The key cutting machine of claim 1, wherein the key holder block is operably connected to a motor via a shaft and is movable by way of the motor to present the inserted key blank to the key cutter for cutting of the inserted key blank via the key cutter.

11. The key cutting machine of claim 1, wherein the key holder assembly is adapted to hold each type of the set of key types comprising automotive, residential, high security, and flip key.

12. The key cutting machine of claim 1, wherein the first and second ramps each have a wall depth ($\delta$) of approximately 3 mm.

13. The key cutting machine of claim 1, wherein the at least one second biasing member comprises a spring pin assembly received in a respective bore formed in a key holder clamp that includes the first angled ramp.

14. The key cutting machine of claim 1, further comprising a key holder clamp block including the first angled ramp, and wherein the at least one second biasing member is received within a bore formed in the key holder clamp block.

15. The key cutting machine of claim 1, wherein the key holder block comprises a bore adapted to receive a pin and the at least one first biasing member.

16. The key cutting machine of claim 15, further comprising a key clamp plunger comprising the second angled ramp, the key clamp plunger further comprising a bore aligned with the bore of the key holder block.

* * * * *